(12) United States Patent
Tsai et al.

(10) Patent No.: US 9,008,182 B2
(45) Date of Patent: Apr. 14, 2015

(54) MOTION PREDICTION METHOD AND VIDEO ENCODING METHOD

(75) Inventors: Yu-Pao Tsai, Fongshan (TW); Chih-Ming Fu, Hsinchu (TW); Jian-Liang Lin, Su'ao Township, Yilan County (TW); Yu-Wen Huang, Taipei (TW); Shaw-Min Lei, Sijhih (TW)

(73) Assignee: MediaTek Inc., Hsin-Chu (TW)

( * ) Notice: Subject to any disclaimer, the term of this patent is extended or adjusted under 35 U.S.C. 154(b) by 303 days.

(21) Appl. No.: 12/962,411

(22) Filed: Dec. 7, 2010

(65) Prior Publication Data

US 2011/0176613 A1    Jul. 21, 2011

Related U.S. Application Data

(60) Provisional application No. 61/295,810, filed on Jan. 18, 2010, provisional application No. 61/326,731, filed on Apr. 22, 2010.

(51) Int. Cl.
*H04N 11/02* (2006.01)
*H04N 19/56* (2014.01)
*H04N 19/513* (2014.01)

(52) U.S. Cl.
CPC ............ *H04N 19/56* (2013.01); *H04N 19/513* (2013.01)

(58) Field of Classification Search
CPC .................. H04N 19/00696; H04N 19/00884; H04N 19/00278; H04N 19/00781; H04N 19/00024; H04N 19/00684; H04N 19/00587; H04N 19/00218; H04N 19/00018; H04N 19/0003
USPC .................................................. 375/240.16
IPC ........................................................ H04N 11/02
See application file for complete search history.

(56) References Cited

U.S. PATENT DOCUMENTS

| 5,991,447 | A | 11/1999 | Eifrig et al. | |
| 8,155,189 | B2 * | 4/2012 | Yan ........................... | 375/240.13 |
| 8,462,853 | B2 * | 6/2013 | Jeon et al. ................ | 375/240.16 |
| 2003/0072370 | A1 * | 4/2003 | Girod et al. .............. | 375/240.13 |

(Continued)

FOREIGN PATENT DOCUMENTS

| CN | 101232619 | 7/2008 |
| JP | 2007525100 | 8/2007 |
| WO | WO 2009/051419 | 4/2009 |

OTHER PUBLICATIONS

English language translation of abstract of CN 101232619 (published Jul. 30, 2008).

(Continued)

*Primary Examiner* — Jay Patel
*Assistant Examiner* — Neil Mikeska
(74) *Attorney, Agent, or Firm* — McClure, Qualey & Rodack, LLP (57) ABSTRACT

The invention provides a motion prediction method. First, a plurality of motion vector predictors is obtained to be included in a candidate set for motion prediction of a current unit of a current frame. Whether the current frame is a non-reference frame which is not referred to by other frames for motion prediction is then determined. When the current frame is not the non-reference frame, any motion vector predictor corresponding to a previously coded frame is removed from the candidate set, and a motion vector of the current unit is predicted according to the motion vector predictors of the candidate set.

14 Claims, 11 Drawing Sheets

(56) References Cited

U.S. PATENT DOCUMENTS

| | | | |
|---|---|---|---|
| 2004/0066854 A1 | 4/2004 | Hannuksela | |
| 2005/0053292 A1* | 3/2005 | Mukerjee et al. | 382/236 |
| 2005/0147167 A1* | 7/2005 | Dumitras et al. | 375/240.16 |
| 2006/0280253 A1* | 12/2006 | Tourapis et al. | 375/240.16 |
| 2007/0171977 A1 | 7/2007 | Kudo et al. | |
| 2008/0008242 A1* | 1/2008 | Lu et al. | 375/240.16 |
| 2008/0080617 A1* | 4/2008 | Kodama | 375/240.16 |
| 2009/0304084 A1* | 12/2009 | Hallapuro et al. | 375/240.16 |
| 2011/0299599 A1 | 12/2011 | Bossen | |

OTHER PUBLICATIONS

Davies, T.; "BBC's Response to the Call for Proposals on Video Compression Technology;" Joint Collaborative Team on Video Coding; Apr. 2010; pp. 1-32.

English language translation of abstract of JP 2007525100 (published Aug. 30, 2007).

* cited by examiner

MOTION PREDICTION METHOD AND VIDEO ENCODING METHOD

CROSS REFERENCE TO RELATED APPLICATIONS

This application claims the benefit of U.S. Provisional Application No. 61/295,810, filed on Jan. 18, 2010, and U.S. Provisional Application No. 61/326,731, filed on Apr. 22, 2010, the entireties of which are incorporated by reference herein.

BACKGROUND OF THE INVENTION

1. Field of the Invention

The invention relates to video processing, and more particularly to motion prediction and encoding of video data.

2. Description of the Related Art

The new upcoming H.264 compression standard can provide good video quality at substantially lower bit rates than previous standards by adopting features such as sub-pixel accuracy and multiple-referencing. The video compression process can be generally divided into 5 parts which include: inter-prediction/intra-prediction, transform/inverse-transform, quantization/inverse-quantization, loop filter, and entropy encoding. H.264 is used in various applications such as Blu-ray Discs, DVB broadcasting services, direct-broadcast satellite television services, cable television services, and real-time videoconferencing.

Figure 1:
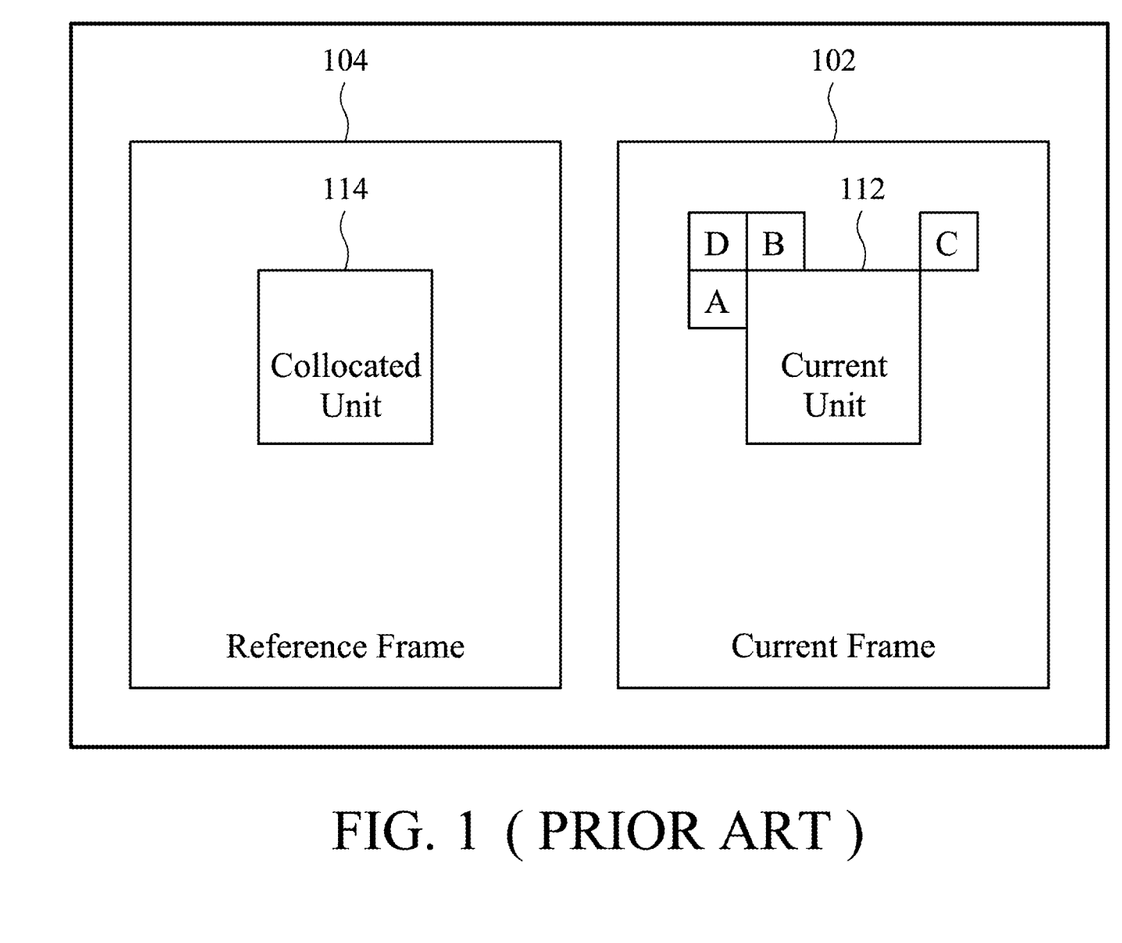
FIG. 1 is a schematic diagram of candidate units for motion prediction of a current unit.

A video datastream comprises a plurality of frames, and each frame is divided into a plurality of coding units (e.g. macroblocks or extended macroblocks) to be respectively processed by a video encoder. Each coding unit can be segmented into quad-tree partitions, and a leaf coding unit is called a prediction unit. A prediction unit can be further segmented into quad-tree partitions, and each partition is assigned with a motion parameter. In order to reduce the cost of transmitting enormous amount of motion parameters, a motion vector predictor (MVP) is calculated for each partition by referencing to adjacent coded blocks, coding efficiency can thus be improved as the motion of the adjacent blocks tends to have high spatial correlation. Referring to FIG. 1, a schematic diagram illustrates adjacent blocks of a current unit 112. A current frame 102 comprises a current unit 112 and a plurality of candidate units A, B, C, and D neighboring to the current unit 112. The candidate unit A is on a left side of the current unit 112, the candidate unit B is on an upper side of the current unit 112, the candidate unit C is in line with an upper-right direction of the current unit 112, and the candidate unit A is in line with an upper-left direction of the current unit 112. Generally, an MVP of a current unit 112 is determined by comparing the motion vectors of the candidate units A, B, and C, and selecting a medium motion vector to be the MVP of the current unit 112. When the candidate unit C does not exist, the motion vectors of the candidate units A, B, and D are compared to each other to select a medium motion vector, and the medium motion vector is determined to be the MVP of the current unit 112.

With slight amendment to the above motion vector prediction method, motion vector competition (MVC) is also provided for motion prediction. According to MVC, more motion vectors are included in a candidate set for motion prediction of a current unit to improved accuracy of motion prediction. For example, the candidate set may comprise motion vectors of adjacent blocks of the current unit 112, as well as a motion vector of a collocated unit 114 which has the same location in a reference frame 104 as that of the current unit 112 in the current frame 102. Rate-distortion optimization (RDO) is used to select a final motion vector predictor for the current unit from the candidate set. The motion vector of the current unit is predicted according to the final motion vector predictor. An index of the final motion vector predictor selected from the candidate set is sent as prediction information to signal video decoders which motion vector predictor is chosen for the current unit.

Figure 2:
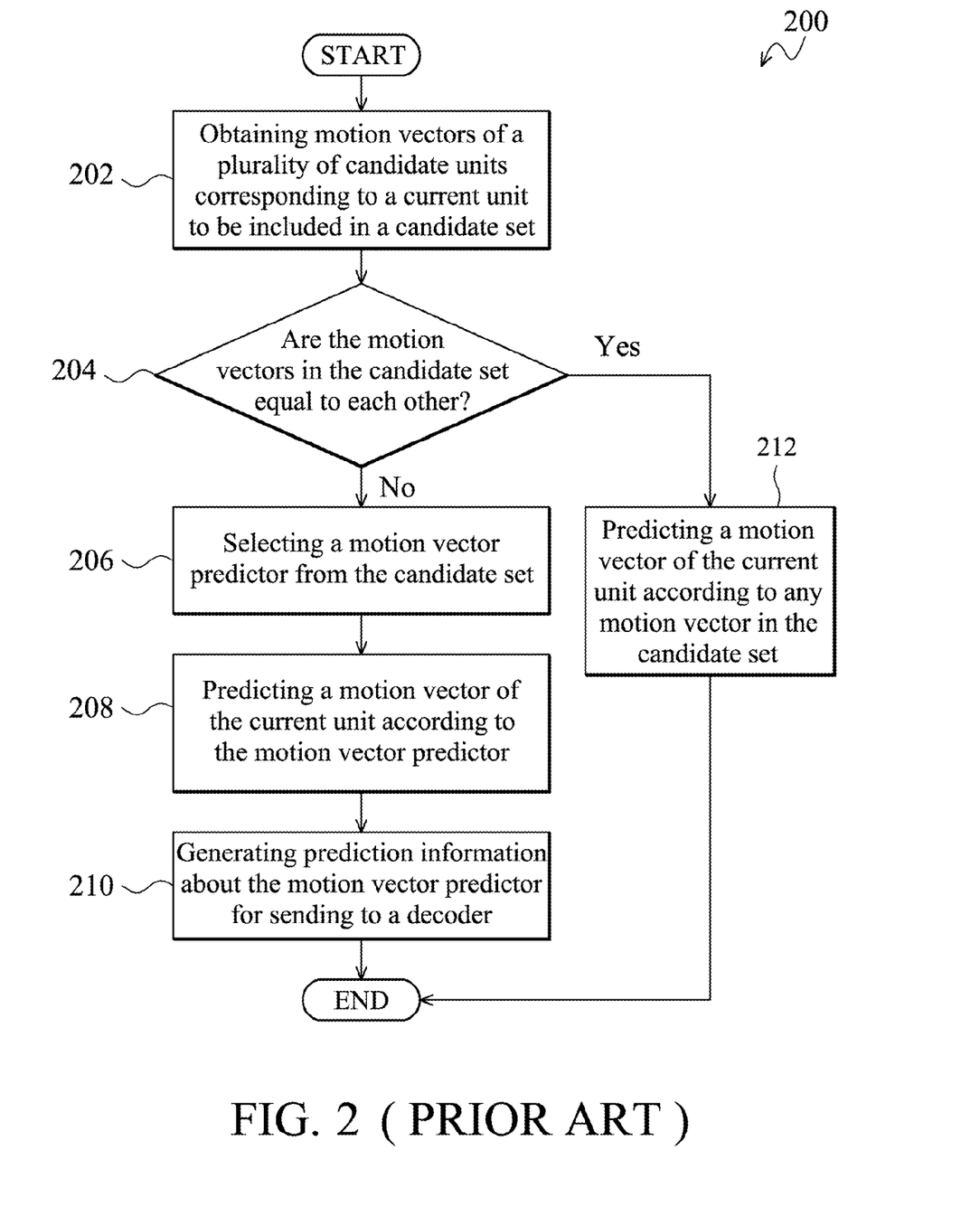
FIG. 2 is a flowchart illustrating a motion vector competition method.

Referring to FIG. 2, a flowchart of a motion prediction method 200 is shown. First, motion vectors of a plurality of candidate units corresponding to a current unit are obtained to include in a candidate set (step 202). The motion vectors in the candidate set are then compared to each other. When the motion vectors are not equal to each other (step 204), a motion vector predictor is selected from the candidate set (step 206), and a motion vector of the current unit is predicted according to motion vector predictor (step 208). Finally, prediction information about the selected motion vector predictor is generated and then sent in the bitstream (step 210). When the motion vectors in the candidate set are equal to each other (step 204), a motion vector of the current unit is predicted according to any of the motion vectors in the candidate set (step 212), and no prediction information about the motion vector predictor is generated and sent in the bitstream.

A parsing error in decoding the bitstream may occur due to incorrect decoding. When a parsing error occurred in syntax parsing during video decoding, all consequent video processing will be failed until a next synchronization symbol is detected. The parsing error may be propagated if inter-frame entropy coding is allowed, an example of inter-frame entropy coding is using motion vectors of previous frame as a motion vector predictor of a current frame to achieve coding gain improvement. Synchronization symbols such as the frame start code used to re-initialize frames may not stop the parsing error propagation. The above mentioned motion vector competition method may also induce parsing error propagation. According to the motion vector competition method 200 of FIG. 2, when the motion vectors in the candidate set are equal to each other, prediction information signaling the motion vector predictor is not sent in the bitstream. When the prediction information about the motion vector predictor is omitted, the data amount of the coded video bitstream sent to the video decoder is reduced. If the video decoder fails to detect intended omission of the prediction information and mistakes a subsequent segment of the coded video datastream as the prediction information, subsequent data in the coded video datastream will be erroneously decoded and this parsing error would propagate.

A parsing error in decoding of a prior frame may lead to a parsing error in decoding of a plurality of succeeding frames, is referred to as parsing error propagation. When a first succeeding frame takes the prior frame as a reference frame, encoding of the first succeeding frame uses coded information of the prior frame. If a parsing error occurs in decoding of the prior frame, because decoding of the first succeeding frame requires decoded information of the prior frame, the parsing error propagates to decoding of the first succeeding frame. When a second succeeding frame takes the first succeeding frame as a reference frame, the parsing error also propagates to decoding of the second succeeding frame. Thus, parsing error propagation will seriously impact decoding of a video datastream.

BRIEF SUMMARY OF THE INVENTION

The invention provides a motion prediction method. First, a plurality of motion vector predictors is obtained to be included in a candidate set for motion prediction of a current unit of a current frame. Whether the current frame is a non-reference frame which is not referred to by other frames for motion prediction is then determined. When the current frame is not the non-reference frame, any motion vector predictor corresponding to a previously coded frame is removed from the candidate set, and a motion vector of the current unit is predicted according to the motion vector predictors of the adjusted candidate set.

The invention provides a motion prediction method. First, a plurality of motion vector predictors is obtained to be included in a candidate set for motion prediction of a current unit of a current frame. The motion vector predictors of the candidate set are then compared with each other. When the motion vector predictors of the candidate set are equal to each other, at least one backup motion vector is selected. The backup motion vector predictor is then added to the candidate set. A motion vector of the current unit is then predicted according to the motion vector predictors of the adjusted candidate set The invention also provides a video encoding method. First, a control flag is generated to indicate whether inter-frame entropy coding, i.e., motion vectors derived from previous coded frame could be included in the candidate set for motion prediction, is allowed in a segment of a video datastream. When the control flag indicates that inter-frame entropy coding is not allowed, inter-frame entropy coding for encoding the segment of the video datastream is disabled. When the control flag indicates that inter-frame entropy coding is allowed, inter-frame entropy coding for encoding the segment of the video datastream is enabled.

The invention also provides a video coding method. First, a series of target frames is inserted between a series of frames of a segment of a video datastream. The segment of the video datastream is then encoded into a bitstream, wherein the target frames are not encoded according to inter-frame entropy coding and subsequent frames of each target frame in coding order not referring to prior frames of the target frame in coding order.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
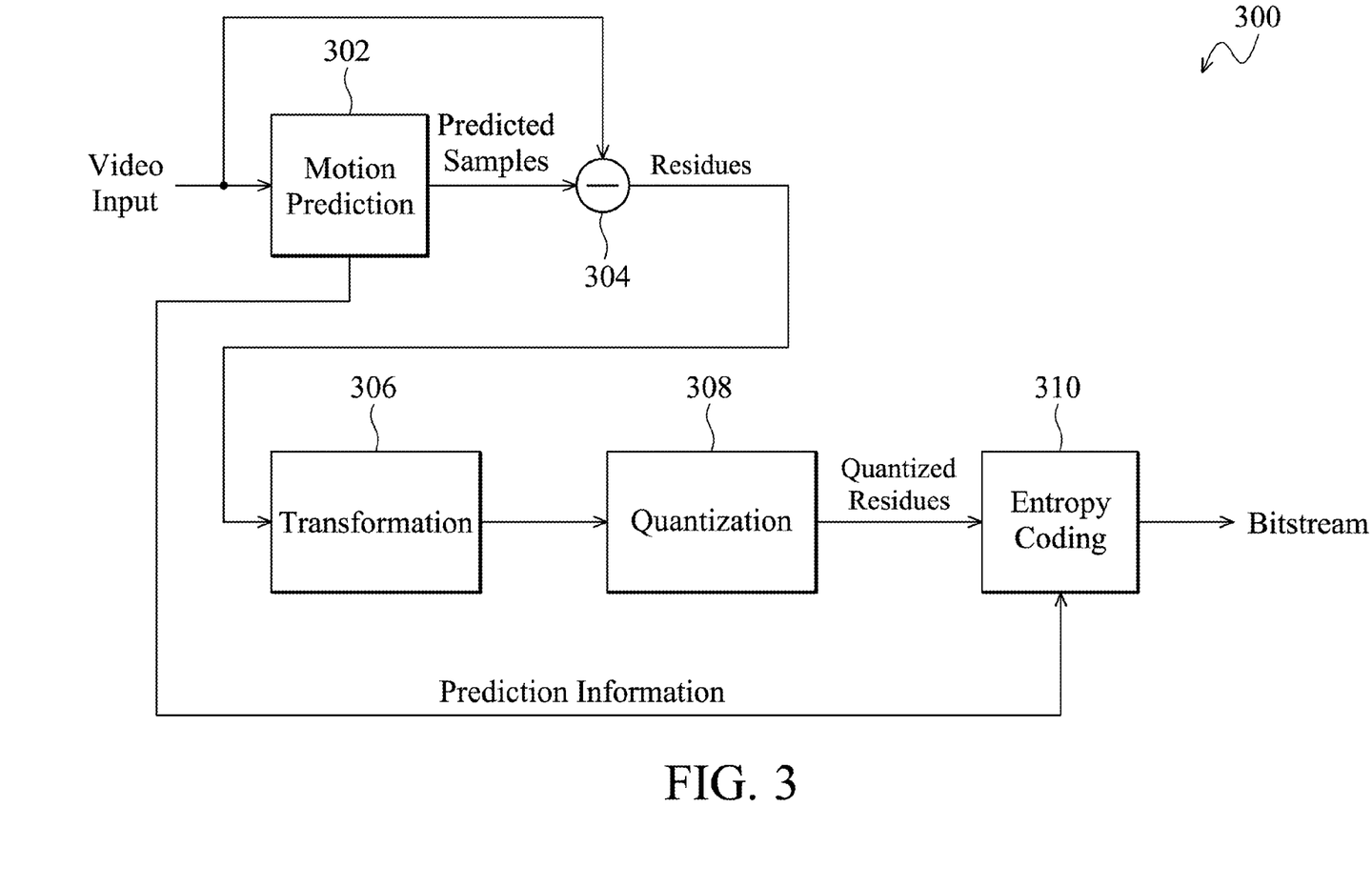
FIG. 3 is a block diagram of an exemplary video encoder.

Referring to FIG. 3, a block diagram of an exemplary video encoder 300 is shown. In one embodiment, the video encoder 300 comprises a motion prediction module 302, a subtraction module 304, a transform module 306, a quantization module 308, and an entropy coding module 310. The video encoder 300 receives a video input and generates a bitstream as an output. The motion prediction module 302 performs motion prediction on the video input to generate predicted samples and prediction information. The subtraction module 304 then subtracts the predicted samples from the video input to obtain residues, thereby reducing video data amount from that of the video input to that of the residues. The residues are then sequentially sent to the transform module 306 and the quantization module 308. The transform module 306 performs discrete cosine transform (DCT) on the residues to obtain transformed residues. The quantization module 308 then quantizes the transformed residues to obtain quantized residues. The entropy coding module 310 then performs entropy coding on the quantized residues and prediction information to obtain a bitstream as a video output.

Figure 4:
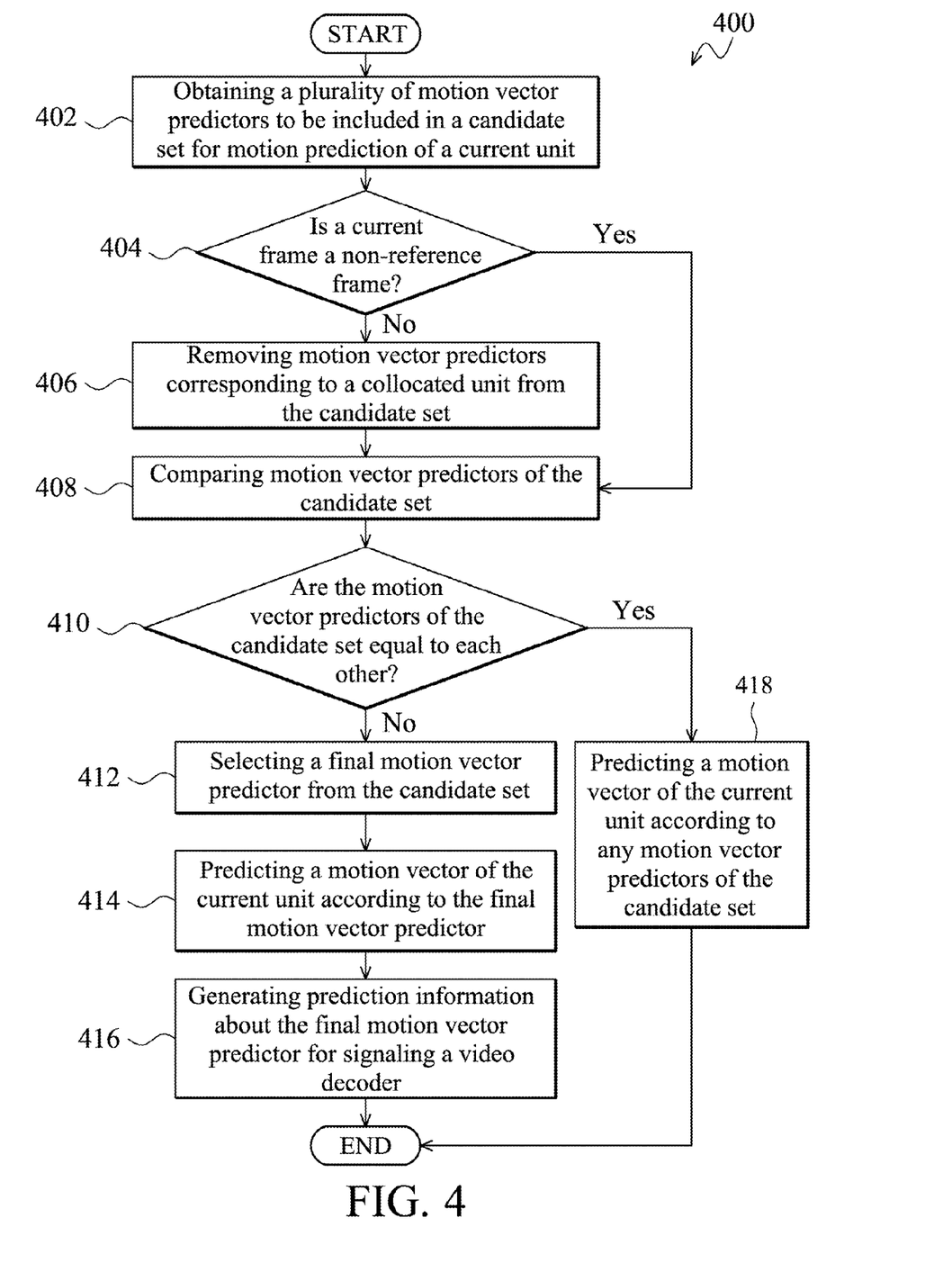
FIG. 4 is a flowchart of a motion prediction method capable of preventing parsing error propagation according to an embodiment of the invention.

Referring to FIG. 4, a flowchart of a motion prediction method 400 capable of preventing parsing error propagation according to an embodiment of the invention is shown. Assume that the motion prediction module 302 receives a current unit of a current frame of a video input datastream. A motion vector predictor for motion prediction of the current unit is determined (step 402). The motion vector predictor may be derived from units located at the current frame (spatial direction) or previously coded frame (temporal direction). The motion vector predictor can be determined by a fixed decision rule or can be adaptively selected. For example, the motion vector competition method selects a final motion vector predictor from a predefined candidate set by applying rate-distortion optimization (RDO). The motion prediction module 302 determines whether the current frame is a non-reference frame which is not referred to by other frames for motion prediction (step 404). In one embodiment, the motion prediction module 302 checks a frame type of the current frame. If the frame type of the current frame is a non-reference B-frame, the current frame is determined to be a non-reference frame.

When the current frame is not a non-reference frame (step 404), because the current frame may become a reference frame of succeeding frames, a parsing error in decoding of the current frame may induce parsing errors in decoding of the succeeding frames. To prevent parsing error propagation, the motion vector predictor for motion prediction of the current unit cannot be derived from previously coded frame (step 406). In one embodiment, any of the motion vector predictor corresponding to collocated units not within the current frame is not included in the predefined candidate set for motion vector competition, in another word, the final motion vector predictor for a current unit is selected from a predefined candidate set only comprises motion vector predictors corresponding to units within the same frame as the current unit.

The motion vector predictors can be motion vectors of neighboring units or derived from one or more of the motion vectors of the neighboring units. Thus, when the motion prediction module 302 predicts the motion vector of the current unit according to the motion vector predictor, a parsing error occurred in the reference frame does not induce parsing errors in decoding of the current unit of the current frame.

The motion prediction module 302 then predicts the motion vector of the current unit according to the motion vector predictor. Inter-frame entropy coding is only allowed for coding units in non-reference frames. In an example of adaptive parsing error control, the frame level syntax is used to control enabling of inter-frame entropy coding. In the case of processing a non-reference frame, inter-frame entropy coding can be used in encoding or decoding; otherwise, inter-frame entropy coding is turned off to prevent parsing error propagation.

In some other embodiments, an adaptive parsing error control method enables or disables inter-frame entropy coding according to a sequence level syntax. For example, an encoder allows inter-frame entropy coding when encoding video data in error free environment, whereas the encoder disable inter-frame entropy coding when encoding video data in lossy environment. The decoder decodes the bitstream according to a sequence level syntax, and adaptively enables or disables inter-frame entropy coding. The adaptive parsing error control method of another embodiment enables or disables inter-frame entropy coding according to a frame level syntax. The above embodiment of allowing inter-frame entropy coding only when processing non-reference frames is one example of adaptive parsing error control based on a frame level syntax.

In an embodiment of motion vector competition, the motion vector predictors in a candidate set are obtained. The motion vector predictors in the candidate set are then compared to each other (step 408). When the motion vector predictors of the candidate set are not equal to each other (step 410), a final motion vector predictor is selected from the candidate set (step 412), and a motion vector of the current unit is predicted according to the final motion vector predictor (step 414). Finally, prediction information about the final motion vector predictor is generated and inserted in the bitstream for signaling a corresponding video decoder (step 416). When the motion vector predictors in the candidate set are equal to each other (step 410), a motion vector of the current unit is predicted according to any of the motion vector predictors of the candidate set (step 418), and no prediction information about the motion vector predictor is generated for signaling the video decoder.

Figure 5:
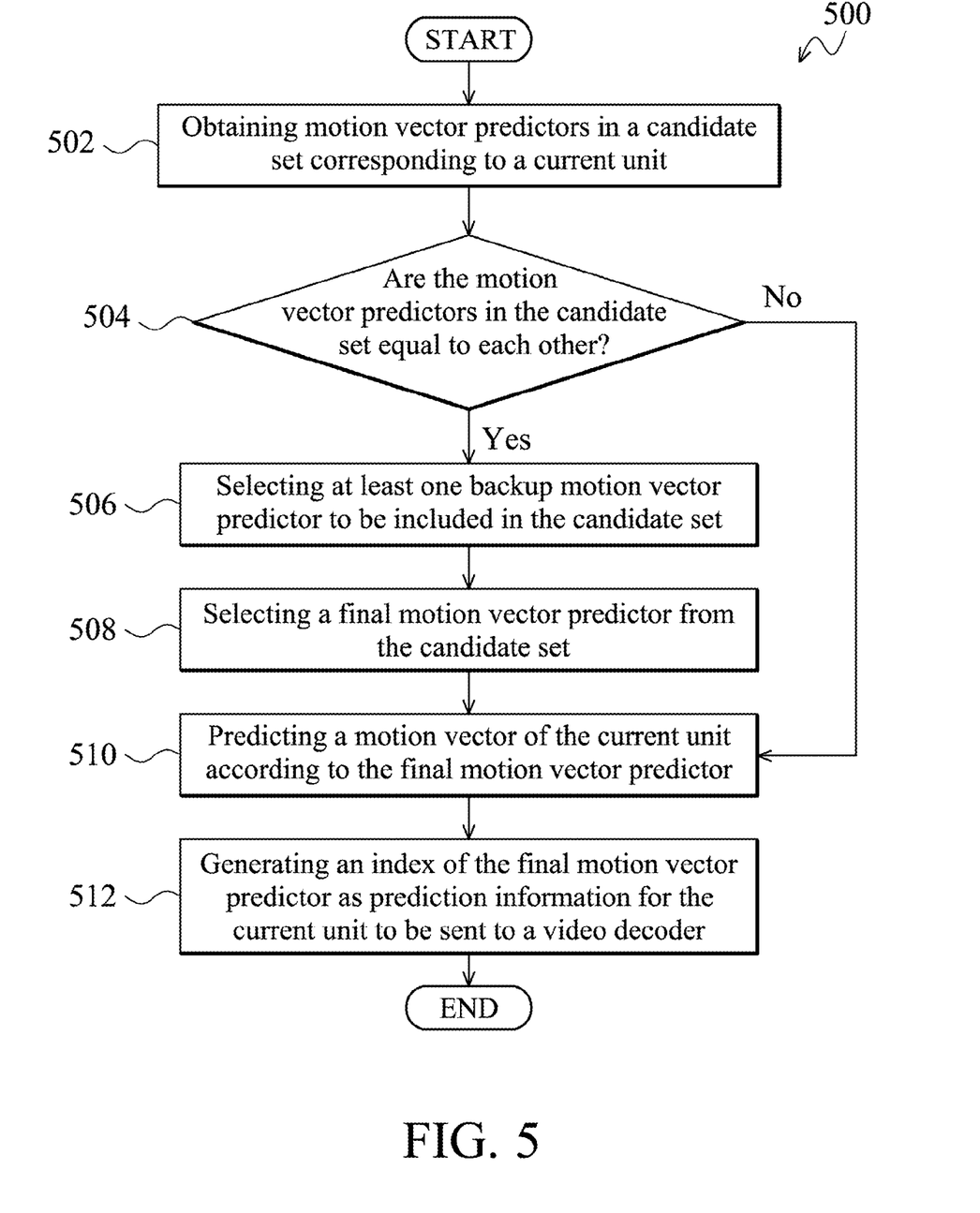
FIG. 5 is a flowchart of a motion prediction method capable of preventing parsing error propagation according to an embodiment of the invention.

Referring to FIG. 5, a flowchart of a motion prediction method 500 capable of preventing parsing error propagation according to an embodiment of the invention is shown. Assume that the motion prediction module 302 receives a current unit of a current frame from a video input datastream, and the motion vector of the current unit is predicted by a final motion vector predictor which is determined by motion vector competition. In one embodiment, a rule for choosing candidate sets is determined in a sequence level of the video input datastream and a final motion vector predictor is chosen from each candidate set according to rate-distortion optimization (RDO). In addition, a rule is set to choose one or more backup motion vector predictors for motion prediction of the current units. First, the motion prediction module 302 obtains motion vector predictors in the candidate set corresponding to the current unit (step 502). The motion prediction module 302 then compares the motion vector predictors in the candidate set and determines whether the motion vector predictors in the candidate set are equal to each other (step 504).

If the motion vector predictors in the candidate set are equal to each other, the number of the motion vector predictors in the candidate set may be increased to provide the motion prediction module 302 with more candidates for motion prediction of the current unit. The motion prediction module 302 therefore selects one or more backup motion vector predictors to be included in the candidate set (step 506), and selects a final motion vector predictor from the candidate set (step 508). The motion prediction module 302 may add more than one backup motion vector predictors in the candidate set at once, or it can add the backup motion vector predictor one at a time. In one embodiment, the backup motion vector predictor is selected according to a predetermined order. In another embodiment, the backup motion vector predictor is selected according to an adaptively determined order. For example, if the motion vector predictors in the candidate set are all the same, the motion prediction module 302 selects a first backup motion vector predictor into the candidate set, and compares the motion vector predictors in the candidate set. If the first backup motion vector predictor is still the same from other motion vector predictors in the candidate set, the motion prediction module 302 adds a second backup motion vector predictor to the candidate set. Once the candidate set comprise at least two different motion vector predictors, the motion prediction module 302 stops adding backup motion vector predictor process. In this case, the encoder has to generate an index of the final motion vector predictor selected from the candidate set as prediction information for the current unit (step 512). A parsing error propagation problem caused by occasionally not sending such index when all motion vector predictors in the candidate set are the same may be prevented.

The motion prediction module 302 then predicts the motion vector of the current unit according to the motion vector predictor (step 510). Finally, the motion prediction module 302 generates prediction information indicating which of the motion vector predictor in the candidate set is selected, and the prediction information is then encoded by the entropy coding module 310 (step 512). In comparison with the conventional motion prediction method 200 shown in FIG. 2 implementing motion vector competition, the motion prediction module 302 according to the method 500 shown in FIG. 5 always generates prediction information no matter whether the motion vector predictors of the original candidate set are equal to each other or not, lowering a probability of parsing error propagation in the video decoder due to omission of the prediction information.

Figure 6:
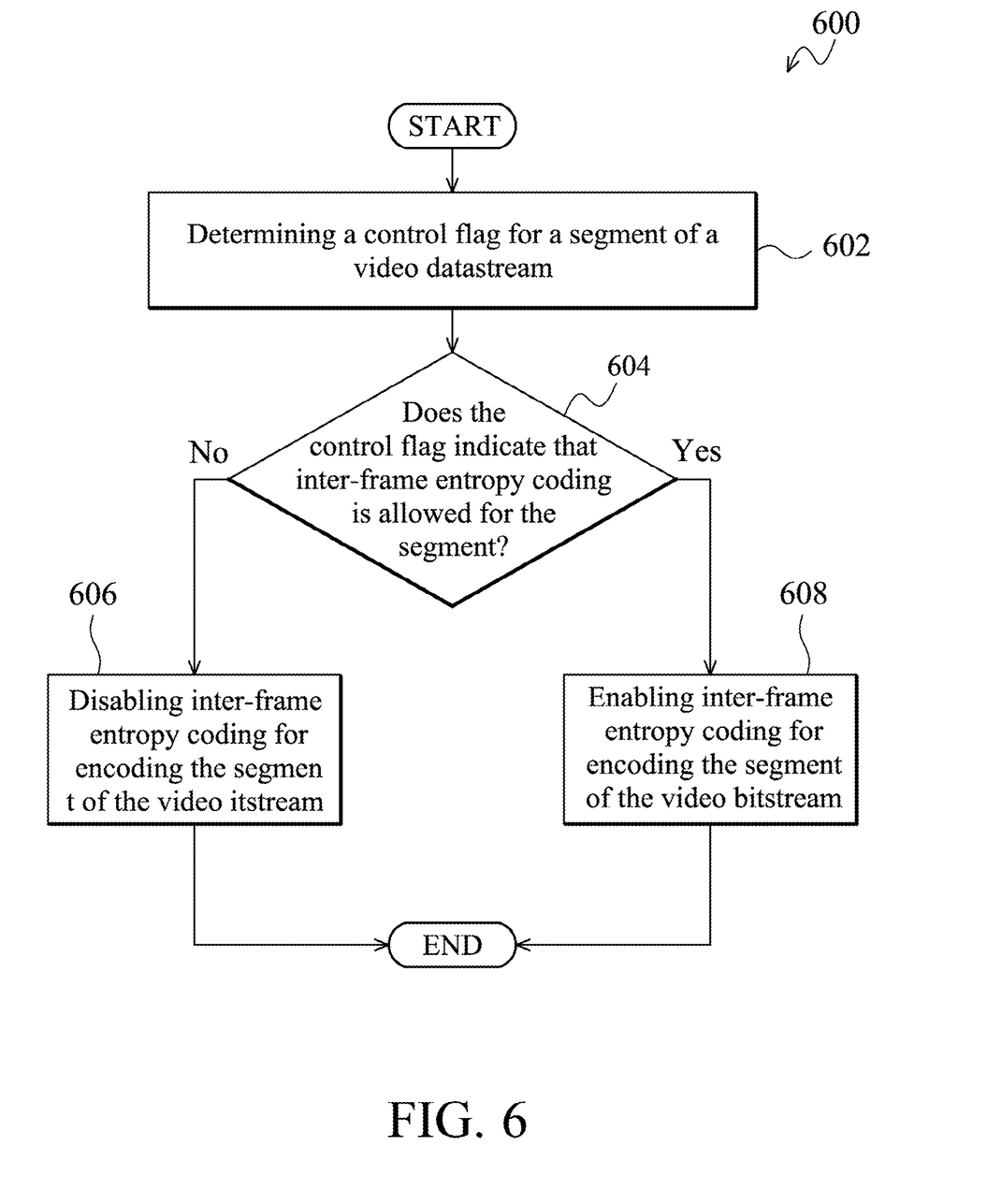
FIG. 6 is a flowchart of a video encoding method capable of preventing parsing error propagation according to an embodiment of the invention.

To prevent error propagation problems in inter-frame entropy coding, a video encoding methods are provided with adaptive parsing error control. Referring to FIG. 6, a flowchart of a video encoding method 600 capable of preventing parsing error propagation according to the invention is shown. First, whether a parsing error is allowed in a segment of a video datastream is determined, and a control flag is generated (step 602). In one embodiment, the segment is a video sequence, and the control flag is generated for the entire video sequence. In another embodiment, the segment is a frame of the video datastream, and the control flag is generated for the frame. In one embodiment, an error rate of the segment is estimated. When the error rate is greater than a threshold, the control flag is generated to indicate that inter-frame coding is not allowed for the segment to prevent parsing error propagation. When the error rate is less than the threshold, the control flag is generated to indicate that inter-frame coding is allowed for the segment. When the control flag of the segment indicates that inter-frame coding is allowed (step 604), inter-frame entropy coding is enabled (step 608), and the entropy coding module 310 can use inter-frame entropy coding to encode data of the segment, thereby increasing coding efficiency. When the control flag of the segment indicates that inter-frame entropy coding is not allowed (step 604), inter-frame entropy coding is disabled (step 606), and the entropy coding module 310 uses intra-frame entropy coding to encode data of the segment, thereby preventing parsing error propagation.

Figure 7:
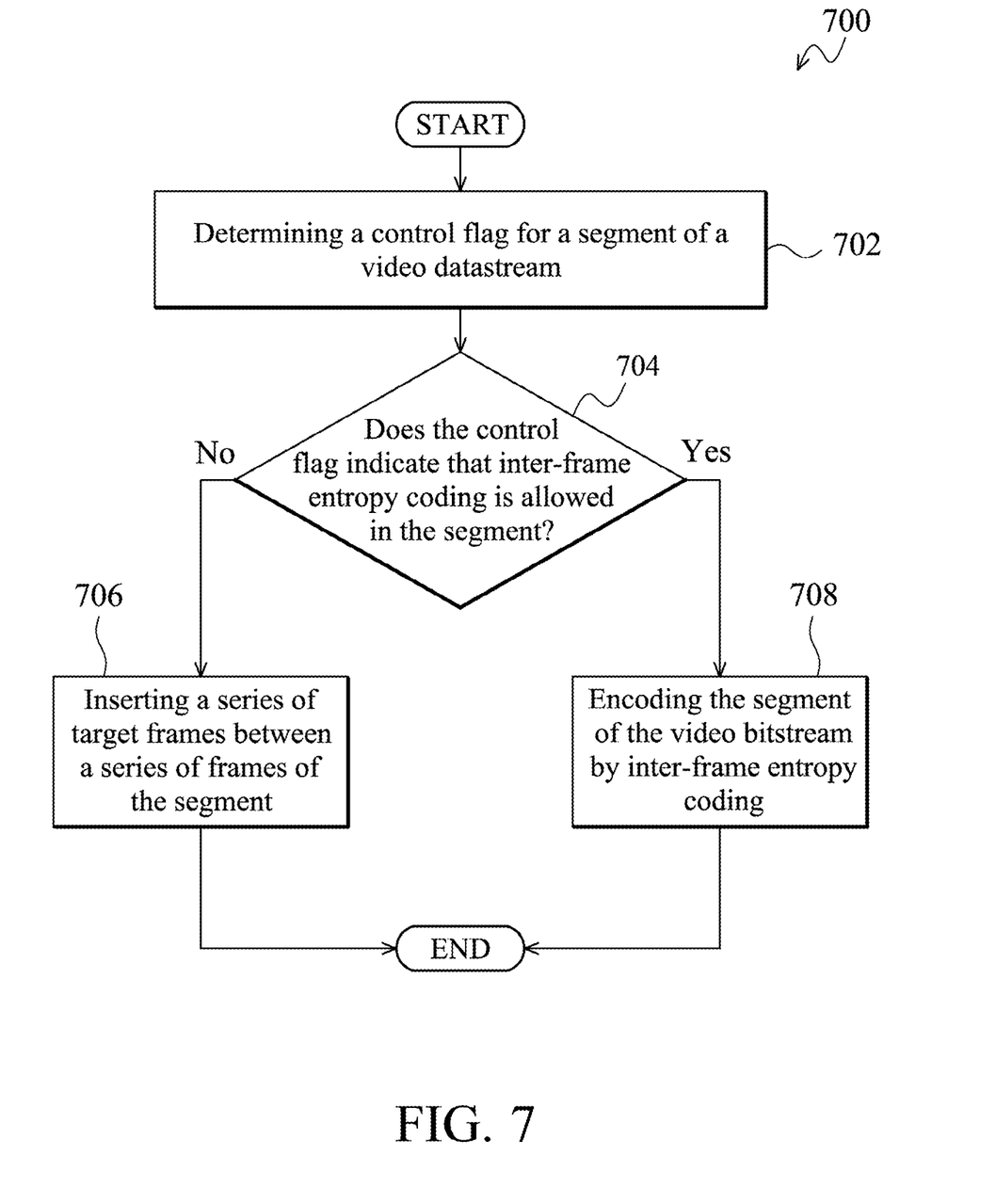
FIG. 7 is a flowchart of a video encoding method capable of preventing parsing error propagation according to an embodiment of the invention.

Referring to FIG. 7, a flowchart of a video encoding method 700 capable of preventing parsing error propagation according to an embodiment of the invention is shown. First, whether a parsing error is allowed in a segment of a video datastream is determined, and a control flag is generated (step 702). In one embodiment, the segment is a video sequence, and the control flag is generated for the entire video sequence. In another embodiment, the segment is a frame of the video datastream, and the control flag is generated for the frame. In one embodiment, an error rate of the segment is estimated. When the error rate is greater than a threshold, the control flag is generated to indicate that inter-frame entropy coding is not allowed for the segment to prevent parsing error propagation. When the error rate is less than the threshold, the control flag is generated to indicate that inter-frame entropy coding is allowed for the segment. When the control flag of the segment indicates that inter-frame entropy coding is allowed for the segment (step 704), inter-frame entropy coding is enabled (step 708), and the entropy coding module 310 can use inter-frame entropy coding to encode data of the segment. When the control flag of the segment indicates that inter-frame entropy coding is not allowed (step 704), a series of target frames are inserted between a series of frames of the segment, wherein the target frames are not encoded according to inter-frame entropy coding (step 706). In one embodiment, the target frames are instantaneous decoder refresh (IDR) frames. An IDR frame stops subsequent frames (in coding order) referring to any frame prior to the IDR frame in coding order. In another embodiment, the target frames are intra frame with open GOP (Group of Picture). In another embodiment, the target frames are general inter-frames without inter-frame entropy coding, that is the general inter-frames do not use any motion vector predictor corresponding to a previously coded frame. For example, the general inter-frames are P-frames or B-frames, and those P-frames and B-frames cannot use inter-frame information such as collocated MVs as motion vector predictors. The target frame can be inserted periodically to prevent parsing error propagation. In one embodiment, the interval of inserting the target frames can be determined in sequence level or GOP (group of pictures) level. The target frames are not encoded according to inter-frame entropy coding, and subsequent frames of the target frames cannot refer to any frame prior to the target frames, parsing errors generated in a frame of the segment does not propagate to the target frames and subsequent frames of the target frames, thereby terminating possible parsing error propagation.

Figure 8A:
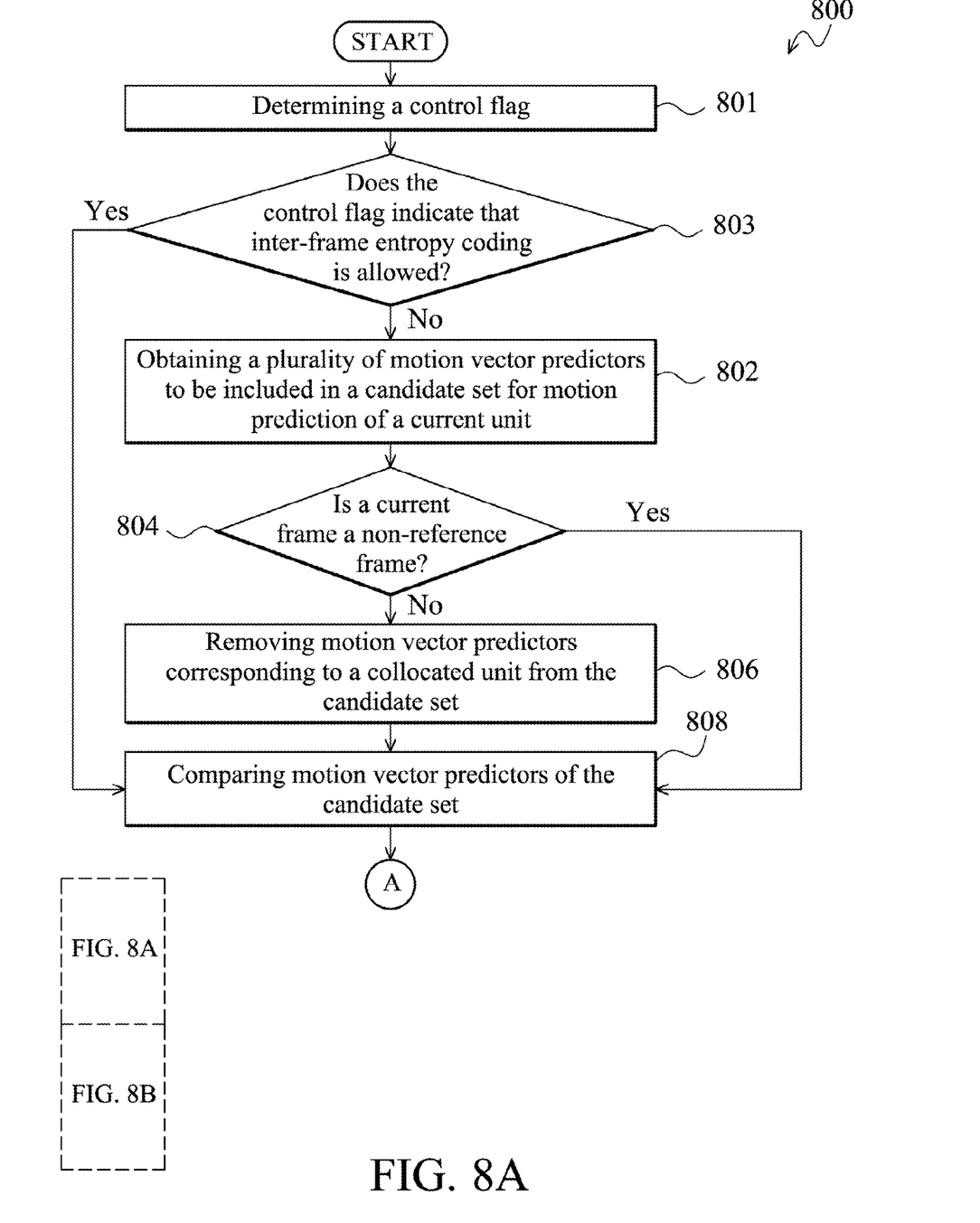
FIG. 8 is a flowchart of a motion prediction method capable of controlling parsing error propagation according to an embodiment of the invention.
Figure 8B:
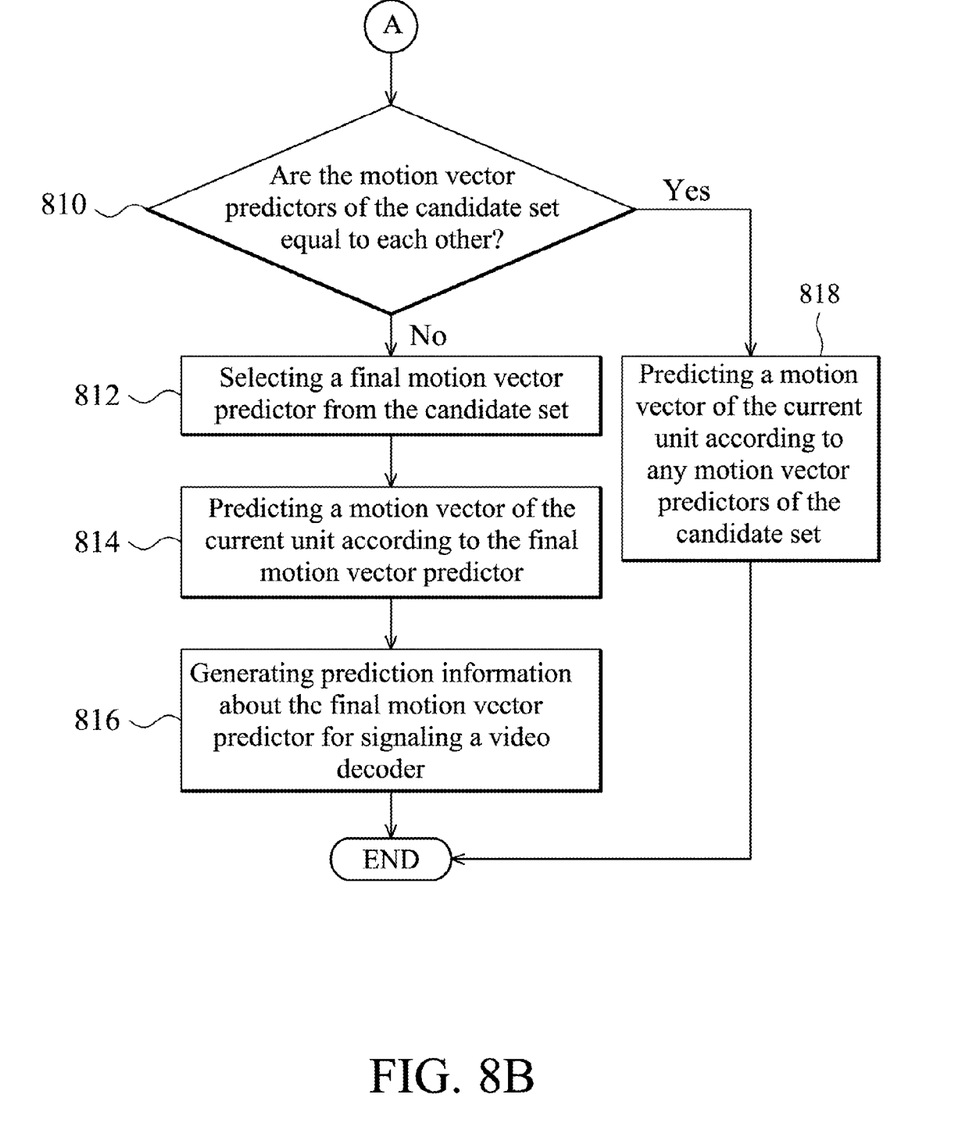

The control flag for switching whether parsing error propagates in processing a segment of a video datastream can also be combined with the motion prediction method 400 shown in FIG. 4. Referring to FIG. 8, a flowchart of an embodiment of a motion prediction method 800 capable of controlling parsing error propagation according to the invention is shown. The steps 802, 804, 806, 808, 810, 812, 814, 816, and 818 of the method 800 are the same as the corresponding steps 402, 404, 406, 408, 410, 412, 414, 416, and 418 of the method 400. Assume that the motion prediction module 302 receives a segment of a video input datastream. At a first step 801, a control flag for a segment of the video datastream is determined according to whether inter-frame entropy coding is allowed in the segment (step 801). When the control flag indicates that inter-frame entropy coding is allowed in the segment (step 803), the motion prediction module 302 performs steps 810~818 to predict motion vectors of a plurality of coding units of the segment, wherein the steps 810~818 are similar to the steps 204~212 in the conventional method 200. When the control flag indicates that inter-frame entropy coding is not allowed in the segment, the motion prediction module 302 performs steps 802~818 to predict motion vectors of a plurality of coding units of the segment, thereby preventing parsing error propagation, wherein the steps 802~818 are the same as the steps 402~418 in the method 400 shown in FIG. 4.

Figure 9A:
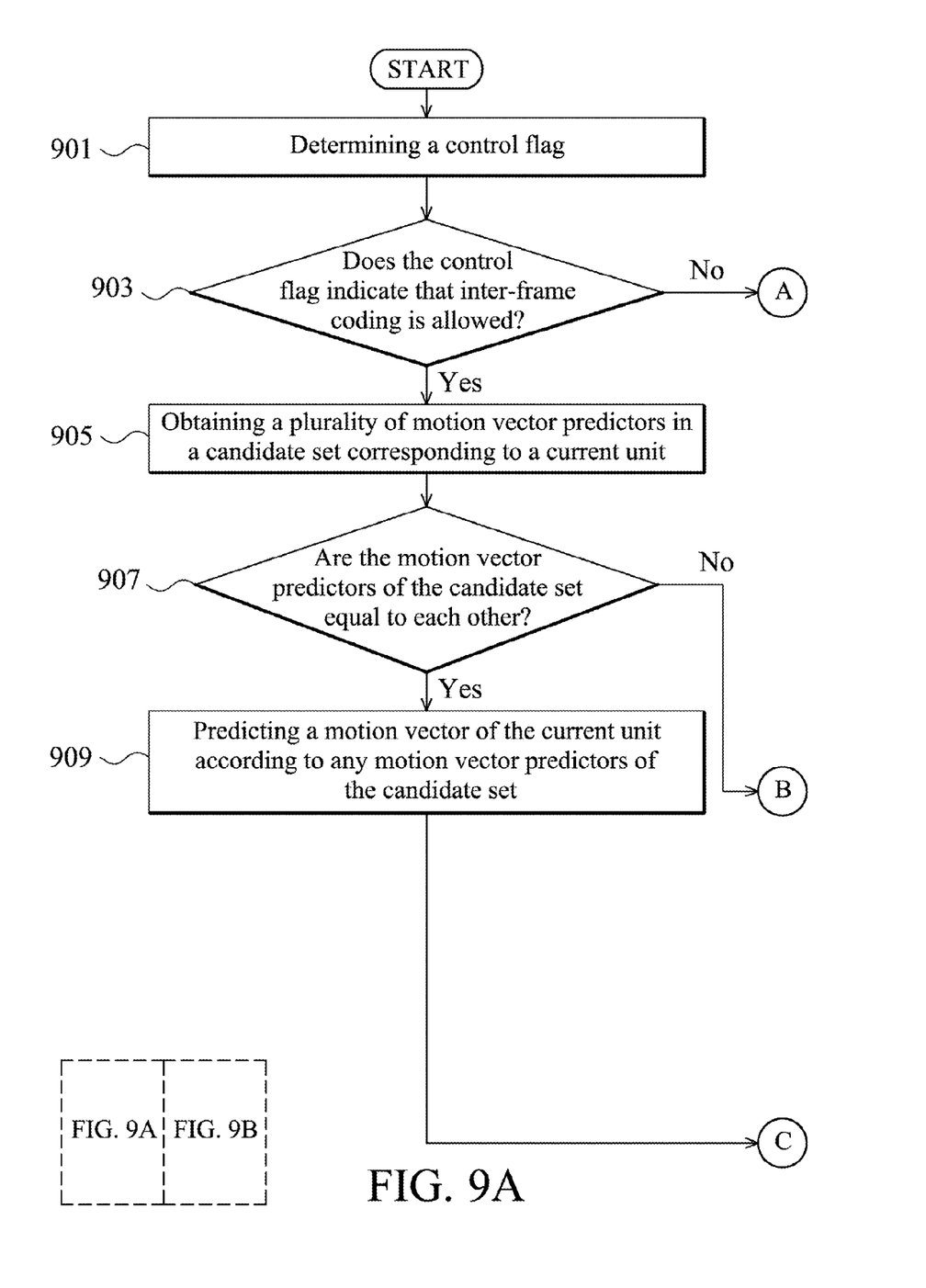
FIG. 9 is a flowchart of a motion prediction method capable of controlling parsing error propagation according to an embodiment of the invention.
Figure 9B:
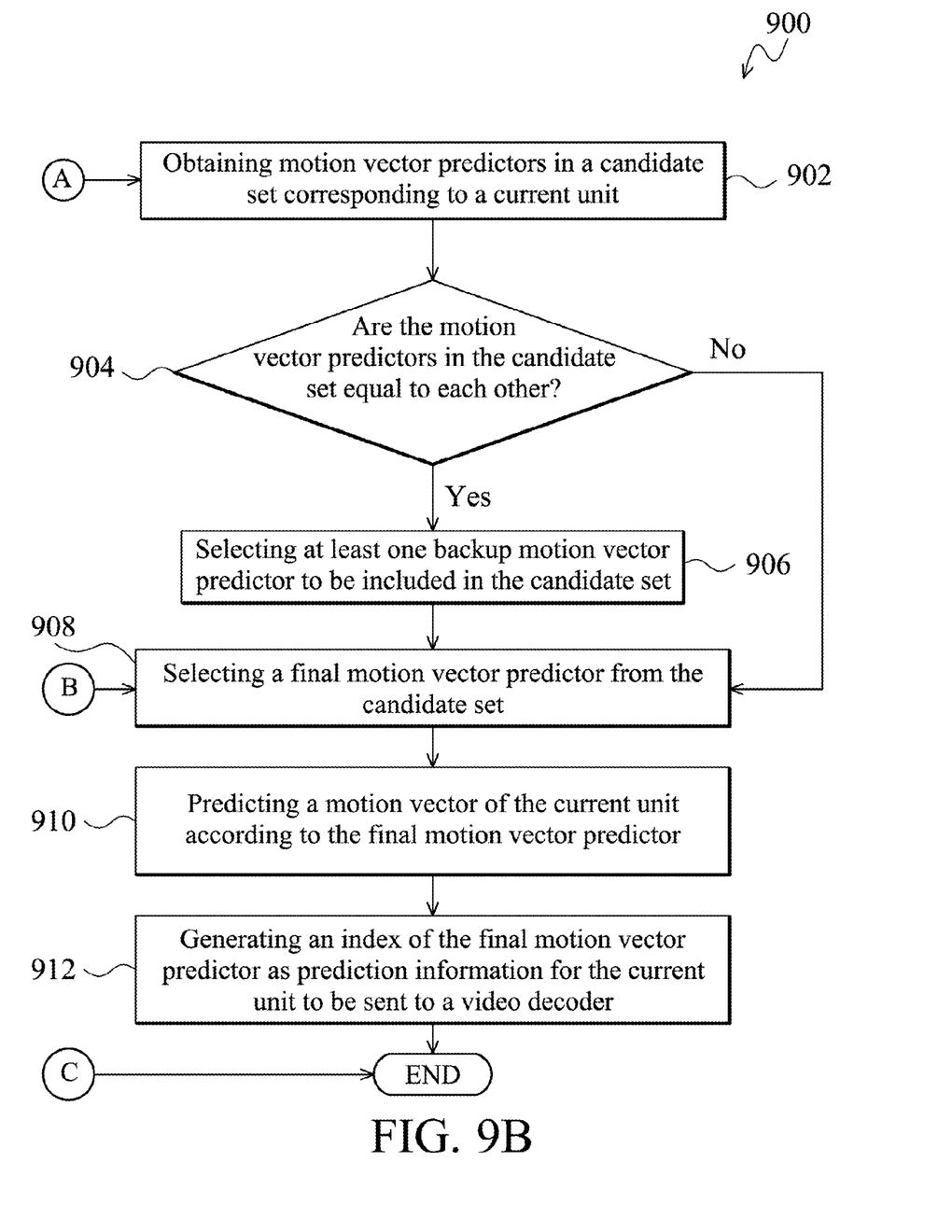

Similarly, the control flag for controlling whether parsing error propagation is allowable in processing a segment of a video datastream can also be combined with the motion prediction method 500 shown in FIG. 5. Referring to FIG. 9, a flowchart of an embodiment of a motion prediction method 900 capable of controlling parsing error propagation according to the invention is shown. The steps 902, 904, 906, 908, 910, and 912 of the method 900 are the same as the corresponding steps 502, 504, 506, 508, 510, and 512 of the method 500. Assume that the motion prediction module 302 receives a segment of a video input datastream. At a first step 901, a control flag for the segment is determined according to whether inter-frame entropy coding is allowed in the segment (step 901). When the control flag indicates that inter-frame entropy coding is not allowed in the segment (step 903), the motion prediction module 302 performs steps 902~912 to predict motion vectors of a plurality of coding units of the segment, thereby preventing parsing error propagation, wherein the steps 902~912 are the same as the steps 502~512 in the method 500 shown in FIG. 5. When the control flag indicates that inter-frame entropy coding is allowed in the segment (step 903), the motion prediction module 302 performs steps 905, 907, 909 and 908~912 to predict motion vectors of a plurality of coding units of the segment, wherein the steps 905, 907, 909 and 908~918 are similar to the steps 202~212 in the conventional method 200.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motion prediction method, comprising:
   (a) obtaining a plurality of motion vector predictors to be included in a candidate set for motion prediction of a current unit of a current frame, wherein the plurality of motion vector predictors comprises at least a spatial motion vector predictor of an adjacent block of the current unit, and at least a temporal motion vector predictor from a collocated unit of the current unit in a previous coded frame;
   (b) determining whether the current frame is a non-reference frame which is not referred to by other frames for motion prediction;
   (c) when the current frame is not the non-reference frame, adjusting the candidate set by removing the temporal motion vector predictor corresponding to the previously coded frame from the candidate set to avoid parsing error propagation;

(d) when the motion vector predictors are equal to each other, adding at least one backup motion vector predictors until a different backup motion vector predictor is obtained:
(e) selecting a final motion vector predictor from the adjusted candidate set by applying rate-distortion optimization; and
(f) predicting a motion vector of the current unit according to the final motion vector predictor of the adjusted candidate set.

2. The motion prediction method as claimed in claim 1, wherein determination of whether the current frame is the non-reference frame comprises:
   determining a frame type of the current frame;
   when the frame type is an I frame or a P frame, determining that the current frame is not a non-reference frame; and
   when the frame type is a B frame, determining that the current frame is a non-reference frame.

3. The motion prediction method as claimed in claim 1, wherein determination of whether the current frame is the non-reference frame comprises:
   determining a frame type of the current frame;
   when the frame type is a non-reference B frame, determining that the current frame is a non-reference frame.

4. The motion prediction method as claimed in claim 1, wherein removing any motion vector predictor from the candidate set comprises:
   determining whether the candidate set comprises at least one target motion vector predictor corresponding to a unit which is not in the current frame; and
   when the target motion vector predictor exists in the candidate set, removing the target motion vector predictor from the candidate set.

5. The motion prediction method as claimed in claim 1, wherein obtaining of the motion vector predictors comprises:
   determining a plurality of units from units located in the current frame or a previously coded frame;
   selecting a plurality of candidate units from the units; and
   obtaining motion vectors of the candidate units as the motion vector predictors of the candidate set.

6. The motion prediction method as claimed in claim 5, wherein selection of the candidate units is according to a fixed decision rule or an adaptive selection rule.

7. The motion prediction method as claimed in claim 1, wherein the method further comprises:
   generating a control flag to indicate whether inter-frame entropy coding is allowed for a segment of a video datastream;
   when the control flag indicates that inter-frame entropy coding is not allowed, performing the steps of (a), (b), (c), (d) and (e) for motion prediction; and
   when the control flag indicates that inter-frame entropy coding is allowed, predicting the motion vector of the current unit according to the motion vector predictors of the candidate set without removing the motion vector predictor from the candidate set no matter whether the current frame is the non-reference frame.

8. A motion prediction method, comprising:
(a) obtaining a plurality of motion vector predictors to be included in a candidate set for motion prediction of a current unit of a current frame;
(b) comparing the motion vector predictors of the candidate set with each other to determine if the motion vector predictors are equal to each other;
(c) when the motion vector predictors of the candidate set are equal to each other, selecting at least one backup motion vector predictor;
(d) adding the backup motion vector predictor to the candidate set; and
(e) predicting a motion vector of the current unit according to the motion vector predictors of the candidate set.

9. The motion prediction method as claimed in claim 8, wherein the prediction of the motion vector of the current unit comprises:
   selecting a final motion vector predictor from the motion vector predictors of the candidate set; and
   predicting the motion vector of the current unit according to the final motion vector predictor.

10. The motion prediction method as claimed in claim 9, wherein the method further comprises:
    generating an index of the final motion vector predictor as prediction information for the current unit; and
    encoding prediction information in a bitstream.

11. The motion prediction method as claimed in claim 8, wherein selection of the backup motion vector predictor comprises:
    selecting a target motion vector predictor from a plurality of predetermined motion vector predictors;
    comparing the target motion vector predictor with the motion vector predictors of the candidate set;
    when the target motion vector predictor is different from the motion vector predictors of the candidate set, determining the target motion vector predictor to be the backup motion vector predictor; and
    when the target motion vector predictor is equal to the motion vector predictors of the candidate set, repeating selection of the target motion vector predictor and comparison of the target motion vector predictor and the candidate set until the target motion vector predictor is different from the motion vector predictors of the candidate set to determine the target motion vector predictor to be the backup motion vector predictor.

12. The motion prediction method as claimed in claim 8, wherein obtaining of the motion vector predictors comprises:
    determining a plurality of units from units located in the current frame or a previously coded frame;
    selecting a plurality of candidate units from the units; and
    obtaining motion vectors of the candidate units as the motion vector predictors of the candidate set.

13. The motion prediction method as claimed in claim 12, wherein selection of the candidate units is according to a decision rule determined in a sequence level.

14. The motion prediction method as claimed in claim 8, wherein the method further comprises:
    generating a control flag to indicate whether inter-frame entropy coding is allowed in a segment of a video datastream;
    when the control flag indicates that inter-frame entropy coding is not allowed, performing the steps of (a), (b), (c), (d), and (e) for motion prediction; and
    when the control flag indicates that inter-frame entropy coding is allowed, predicting the motion vector of the current unit according to the motion vector predictors of the candidate set without removing the motion vector predictor in the candidate set no matter whether the motion vector predictors of the candidate set are equal to each other.

* * * * *